United States Patent [19]

Takeda et al.

[11] Patent Number: 5,132,083

[45] Date of Patent: Jul. 21, 1992

[54] LASER PADDING MATERIAL AND A LASER PADDING METHOD USING THE SAME

[75] Inventors: Toshihide Takeda; Kazuo Okamura, both of Osaka, Japan

[73] Assignee: Kabushiki Kaisha Komatsu Seisakusho, Tokyo, Japan

[21] Appl. No.: 467,631

[22] Filed: Jan. 19, 1990

Related U.S. Application Data

[63] Continuation-in-part of Ser. No. 368,303, Jun. 13, 1989, abandoned.

[30] Foreign Application Priority Data

Dec. 15, 1986 [JP] Japan .................. 61-296633

[51] Int. Cl.⁵ .................. C22C 9/06; B05D 1/12
[52] U.S. Cl. .................. 420/472; 420/473; 420/485; 420/487; 420/490; 75/247; 427/53.1; 219/121.66
[58] Field of Search .............. 420/470, 471, 472, 473, 420/485, 486, 487, 489, 490; 75/235, 244, 247; 427/53.1, 192; 219/121.66

[56] References Cited

U.S. PATENT DOCUMENTS

| | | | |
|---|---|---|---|
| 2,964,397 | 12/1960 | Cooper | 75/247 |
| 4,269,868 | 5/1981 | Livsey | 427/192 |
| 4,474,861 | 2/1984 | Ecer | 428/614 |
| 4,725,708 | 2/1988 | Kawasaki et al. | 219/121.66 |
| 4,746,540 | 5/1988 | Kawasaki et al. | 219/121.66 |
| 4,832,982 | 5/1989 | Mori et al. | 219/121.66 |
| 4,931,323 | 6/1990 | Manitt et al. | 427/53.1 |
| 4,941,919 | 7/1990 | Asada et al. | 75/235 |
| 4,947,463 | 8/1990 | Matsuda et al. | 219/121.66 |

FOREIGN PATENT DOCUMENTS

| | | |
|---|---|---|
| 623898 | 7/1961 | Canada .................. 75/247 |
| 221752 | 5/1987 | European Pat. Off. .......... 427/53.1 |
| 535673 | 4/1941 | United Kingdom . |
| 1206380 | 9/1970 | United Kingdom . |

Primary Examiner—R. Dean
Assistant Examiner—George Wyszomierski
Attorney, Agent, or Firm—Spensley Horn Jubas & Lubitz

[57] ABSTRACT

A laser padding material in accordance with the present invention comprises copper as its main component and at least one, as other contained elements, selected from the group consisting of 1-5 weight % of nickel (Ni), 0.2-5 weight % of silicon (Si), less than 1 weight % of boron (B), less than 2 weight % of phosphorus (P) and less than 3 weight % of manganese (Mn), whereby there can be easily formed at a high speed a padded layer which is high both in sliding friction resistance and in quality.

In accordance with a laser padding method of the present invention, since material powder having such a composition as mentioned above is blown onto a metal base material and at the same time a laser beam is irradiated thereon in an inert gas atmosphere to thereby melt the material powder and form a padded layer, there can be easily formed at a high speed a padded layer which is high both in sliding friction resistance and in quality.

16 Claims, 10 Drawing Sheets

| No. | COMPONENTS (%) | | | | | |
|---|---|---|---|---|---|---|
| | Cu | Ni | Si | P | B | Sn |
| A | Bal. | 0.5 | 0.13 | 0.4 | 0.1 | -- |
| B | Bal. | 1.0 | 0.25 | 0.4 | 0.1 | -- |
| C | Bal. | 3.0 | 0.5 | 0.7 | 0.3 | -- |
| D | Bal. | 5.0 | 0.75 | 1.0 | 0.5 | -- |
| E | Bal. | 7.0 | 1.0 | 1.3 | 0.7 | -- |
| F | Bal. | 0.5 | 0.13 | 0.4 | 0.2 | 10.0 |
| G | Bal. | 1.0 | 0.24 | 0.4 | 0.1 | 10.0 |
| H | Bal. | 3.0 | 0.7 | 0.7 | 0.3 | 9.0 |
| I | Bal. | 5.0 | 1.2 | 1.0 | 0.5 | 8.0 |
| J | Bal. | 7.0 | 1.7 | 1.3 | 0.7 | 8.0 |

| Cu | Ni | Si | B | P | Mo₂B₅ |
|---|---|---|---|---|---|
| Baℓ | 2.5% | 0.5% | 0.2% | 0.3% | 0.01% |

(WEIGHT %)

GAS DEFECT G     200 μm     PADDING LAYER

BASE MATERIAL

| OXIDE | FREE ENERGY $\Delta G° = RT \ln P_{O_2}$ (kg cal/gr mol $O_2$) |
|---|---|
| CuO | 3 |
| $Cu_2O$ | −24 |
| PbO | −32 |
| NiO | −34 |
| ZnO | −44 |
| $SnO_2$ | −48 |
| $Fe_2O_3$ | −56 |
| FeO | −72 |
| $SiO_2$ | −130 |
| $B_2O_3$ | −135 |

FIG. 9

| OXIDE | FREE ENERGY $\Delta G° = RT \ln P_{O_2}$ (kg cal/gr mol $O_2$) |
|---|---|
| CuO | −3 |
| $Cu_2O$ | −26 |
| PbO | −29 |
| NiO | −36 |
| $SnO_2$ | −52 |
| ZnO | −53 |
| $Fe_2O_3$ | −60 |
| FeO | −74 |
| CO | −128 |
| $SiO_2$ | −135 |
| $B_2O_3$ | −138 |

FIG. 10

| No. | COMPONENTS (%) | | | | | |
|---|---|---|---|---|---|---|
| | Cu | Ni | Si | P | B | Sn |
| A | Bal. | 0.5 | 0.13 | 0.4 | 0.1 | -- |
| B | Bal. | 1.0 | 0.25 | 0.4 | 0.1 | -- |
| C | Bal. | 3.0 | 0.5 | 0.7 | 0.3 | -- |
| D | Bal. | 5.0 | 0.75 | 1.0 | 0.5 | -- |
| E | Bal. | 7.0 | 1.0 | 1.3 | 0.7 | -- |
| F | Bal. | 0.5 | 0.13 | 0.4 | 0.2 | 10.0 |
| G | Bal. | 1.0 | 0.24 | 0.4 | 0.1 | 10.0 |
| H | Bal. | 3.0 | 0.7 | 0.7 | 0.3 | 9.0 |
| I | Bal. | 5.0 | 1.2 | 1.0 | 0.5 | 8.0 |
| J | Bal. | 7.0 | 1.7 | 1.3 | 0.7 | 8.0 |

FIG. 11

HARDNESS Hv: 148
PADDED DEPTH: 1.0 mm

HARDNESS Hv: 150
PADDED DEPTH: 1.4 mm

LASER PADDING MATERIAL AND A LASER PADDING METHOD USING THE SAME

This is a continuation-in-part application of co-pending commonly assigned U.S. application Ser. No. 07/368,303, filed Jun 13, 1989 now abandoned.

BACKGROUND OF THE INVENTION

1. Technical Field

The present invention relates to laser padding materials and a laser padding method using the same and, more particularly, to a laser padding material and a laser padding method which contains copper as its major component and which is highly resistant to sliding abrasion and friction.

2. Background Art

Much attention is directed to laser padding (laser coating or laser cladding) techniques, because, in addition to the fact that the laser padding can finely control energy density (the diameter of a laser output beam), not only can it increase the processing speed and minimize the reduction of components in a padding alloy due to a parent or base material (that is, the reduction of the alloying components in their composition ratio resulting from the fact that the components of the base material are melted into the padding alloy and thus the alloy components are reduced in their composition ratio) but it can also apply a padded layer as thin as about 0.3 to 1.5 mm only to a necessary part of the base material.

Used as a laser padding apparatus which embodies the aforementioned laser padding, in such a laser padding apparatus as schematically shown in FIG. 3. With the apparatus, a laser beam 3 and such an inert gas as an argon (Ar) gas 4 or the like and padding metal powder 5 are supplied to a groove V provided in a surface of a base material 1 from a supply pipe 2 which is open to the groove V thereabove so that the powder 5 is rapidly melted on the base material 1 and then solidified, thereby forming a padded layer 6 on the base material.

When a laser beam is used, high speed processing can be achieved because the laser beam can provide much thermal energy to a desired local part of an object to be processed, whereby highly accurate padding dimensions can be realized. In addition, since the cooling rate can be high and fine crystalline grain can be obtained, the padded layer can be made high in quality and the processing yield can be also made high.

In this way, the laser padding method has a basic merit that padding can be effected so that the dimensions of the padded part are substantially equal to those of its desired finished product, thus providing a high material yield. And the laser padding method is conventionally used for such cobalt (Co) hardened metal as stellite or the like, nickel (Ni) hardened metal, and such iron (Fe) alloy as stainless steel or the like.

Conventional padding copper (Cu) materials include brass (Cu-Zn) alloy, phosphor bronze known as PBC2A, and copper-tin-lead (Cu-Sn-Pb) alloy known as LBC. It has been, however, impossible to use these materials in the laser padding method for the following reasons, thus disabling the laser padding using copper alloy.

(1) Brass (Cu-Zn) alloy

When a laser beam as a high-density energy source is used, the temperature of molten pool of such padding material exceeds a thousand and several hundred degrees of evaporates and thus padding is impossible, because the boiling point of zinc (Zn) is as low as 908° C.

(2) PBC2A (Cu-Sn) alloy

This material tends to easily contain gas and thus cause some gas defects, though the material is one of copper alloys which can be used even under a high surface pressure and can be effectively used as sliding material.

(3) LBC (Cu-Sn-Pb) alloy

The laser padding provides a high-density energy as has been mentioned above, the processing rate is very fast, and the time period of such material necessary for its phase change from the solid state to the molten state after subjected to a laser beam irradiation, is as short as 0.1 to 0.5 seconds. As a result, the molten material is hardened or set before slag caused by the laser beam irradiation float up to the surface of the molten material, thus causing slag involvement within the padded part.

In addition, when it is desired to perform padding over a wide area by the laser padding method, linear padded layers must be overlapped by each other as shifted mutually slightly as shown in FIG. 4, which results in that slag formed on the surface of the previous padded layer is involved within the next padded layer during the next padding operation, as shown in FIG. 5.

In this manner, since any copper alloys have not been able to be employed in the laser padding method, the realization of copper laser padding material excellent in its sliding-abrasion resistant characteristic has been desired.

In view of the aforementioned circumstances in the prior art, it is an object of the present invention to provide a laser padding material (based on copper) and a laser padding method using the same which is highly resistant to sliding abrasion and friction and which allows a high quality of laser padding.

DISCLOSURE OF THE INVENTION

A laser padding material in accordance with the present invention comprises copper (Cu) as its main component and at least one selected from the group consisting of 1-5 weight % of nickel (Ni), 0.2-5 weight % of silicon (Si), less than 1 weight % of boron (B), less than 2 weight % of phosphorus (P), and less than 3 weight % of manganese (Mn).

In accordance with a method of the present invention, a padding material comprises copper (Cu) as its main component and at least one selected from the group consisting of 1-5 weight % of nickel (Ni), 0.2-5 weight % of silicon (Si), less than 1 weight % of boron (B), less than 2 weight % of phosphorus (P), and less than 3 weight % of manganese (Mn); powder of the material is blown toward a base metal material and at the same time, the material powder is subjected to a laser beam in an inert gas atmosphere, so that the material powder is melted and a padded layer of the melted powder material is formed on the base metal material.

More in detail, the laser padding material of the present invention comprises, as basic components, Cu, Ni and Si, among which Ni and Si are combined into an Ni-Si compound which acts to increase the hardness of the padded alloy. Accordingly, the addition amounts of Ni and Si are determined so that the molar ratio of Ni to Si in the padding material becomes 2 to 1. When the addition amount of Ni in the padding material exceeds 3 weight percent and the partner material is based on iron, a baking phenomenon sometimes occurs between the padded material and the iron-based material during the sliding of the padded material on the iron-based material, in particular, under a high surface pressure. For this reason, Ni$_2$Si to be contained in the padded material is set to be optimumly 2-3 weight percentage, but another quantity of Ni$_2$Si may be employed without causing any special troubles so long as Ni content in the Ni$_2$Si falls within a range of 1 to 5 weight percentage and Si content therein falls within a range of 0.2 to 5 weight percent.

When laser padding was carried out with use of a material comprising 2-3 weight % of Ni$_2$Si and the remaining all copper and then the padded alloy was subjected to an aging treatment for an hour at 500° C., the resultant copper alloy was as very high as about 15 H$_{RB}$.

Elements Si, B, P and Mn combined with oxygen float up to the surface of the molten copper alloy. In this way, by forcingly forming slag as very light as about several tenths of the specific gravity of the copper alloy, such slag can be floated upward due to a difference in specific gravity between the slag and the alloy to be separated, thus preventing the slag involvement within the alloy.

That is, the elements Si, B, P and Mn act as deoxidation agents. When at least one selected from the group consisting of less than 1 weight % of B, less than 2 weight % of P and less than 3 weight % of Mn is used in particular, gas defects caused by the deoxidation agent action can be favorably prevented.

Also effective, in addition to the aforementioned deoxidation agents, are aluminum (Al) and calcium (Ca) and the like which are contained in the padding material preferably in a range of less than 1 weight percent. For example, the alloy powder may comprise Cu, Ni, Si and less than 1 weight % of Al. In this way, there can be a good quality of dense, padded layer which is free from slag involvement and gas defect, high in hardness and also highly resistant to sliding abrasion and friction.

Further, when the padding operation is carried out with use of a padding material which contains, in addition to the above components, fine ceramic particles dispersed therein, the padded alloy obtained can exhibit a more excellent anti-friction characteristic. In this case, practically any ceramic material can be employed as will be explained later, so long as the ceramic material has an HV of above 2,000. However, it is desirable to use such ceramic material than can provide a smallest specific gravity difference with respect of the above alloy material. This is because the presence of such specific gravity difference prevents the uniform dispersion of the ceramic material. Our tests have showed that the addition of about 0.01 weight % of ceramic material having a particle size of about several μm can prepare such a padded alloy that can exhibit the highest PV value. The PV value shows a sliding friction characteristic expressed as a product of surface pressure (P) and sliding speed (V).

Ceramic materials acting to increase the above PC value include, for example, Mo$_2$B$_5$, MoB, SiC, Si$_3$N$_4$ and Al$_2$O$_3$; and one or more of these materials may be contained in the padding material at a single or total level of less than of 30 weight %. The determination of the level of less than 30 weight percentage was to avoid the strength of the alloy from being reduced when the ceramic level is set below 30 weight %.

Tin (Sn) or lead (Pb) frequently added generally in a sliding copper alloy may be added respectively in 8-15 weight percentage and 8-15 weight percentage in the above materials.

BRIEF DESCRIPTION OF THE DRAWINGS

FIGS. 9 and 10 are diagrams showing oxide formation free energies at 1600° C. and at 1500° C., respectively;

FIG. 11 is a table showing the respective components, in percentage, of laser padding materials in accordance with another embodiment of the present invention;

Figures 1, 2:
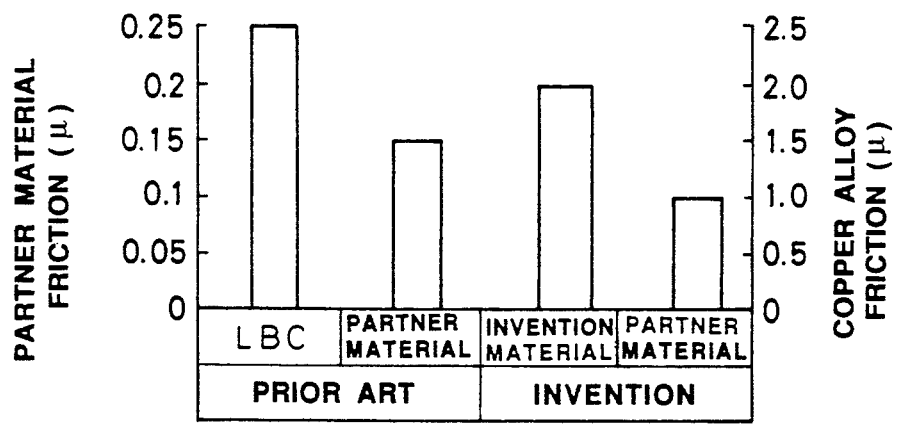
FIG. 1 is a table showing percentage ratios between components contained in a laser padding material in accordance with an embodiment of the present invention.
FIG. 2 is a graph comparatively showing results of a sliding-friction test for the material of FIG. 1, together with results of the same test for a prior art material.
Figure 3:
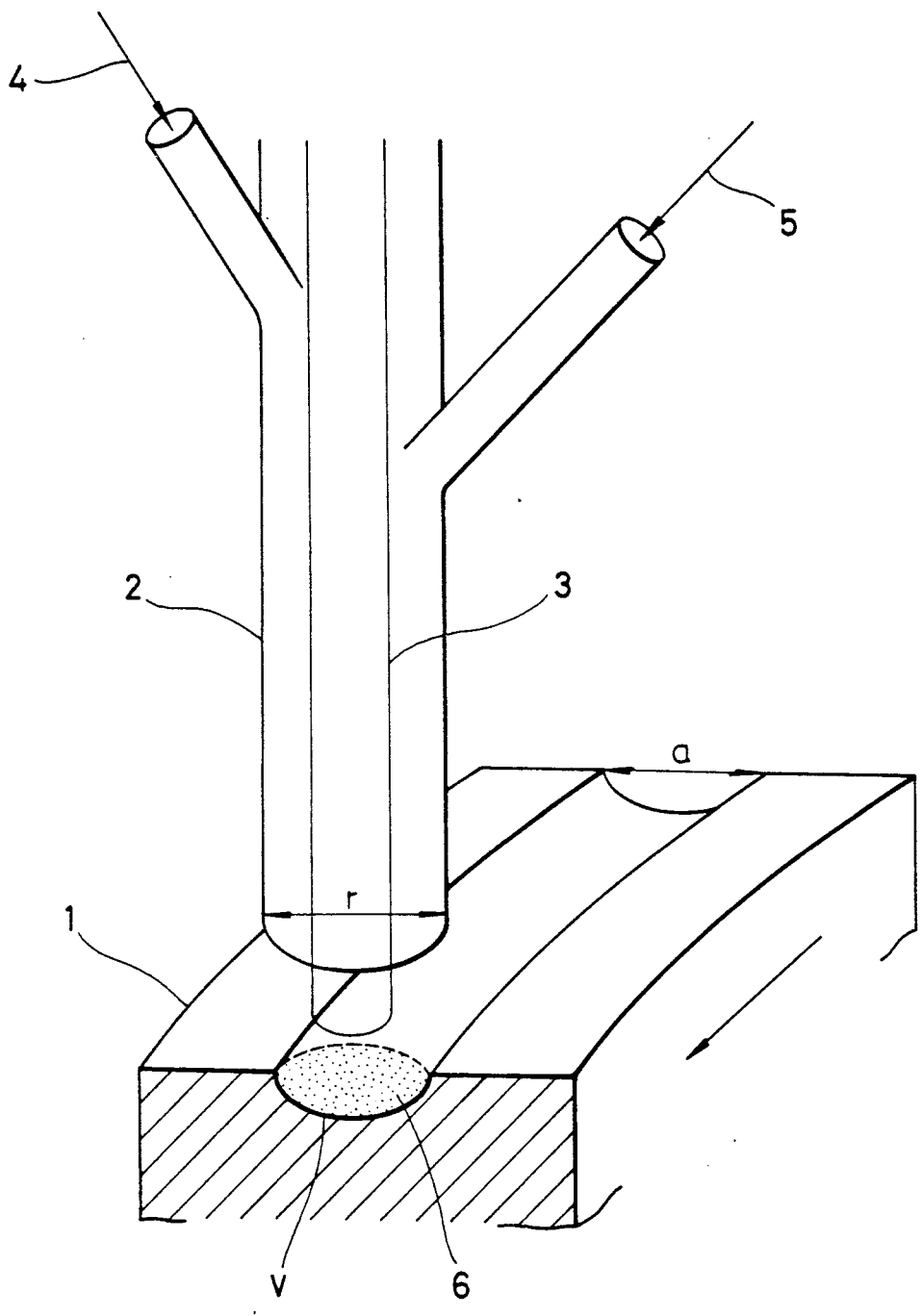
FIG. 3 is a diagram for explaining a laser beam padding.
Figure 4:
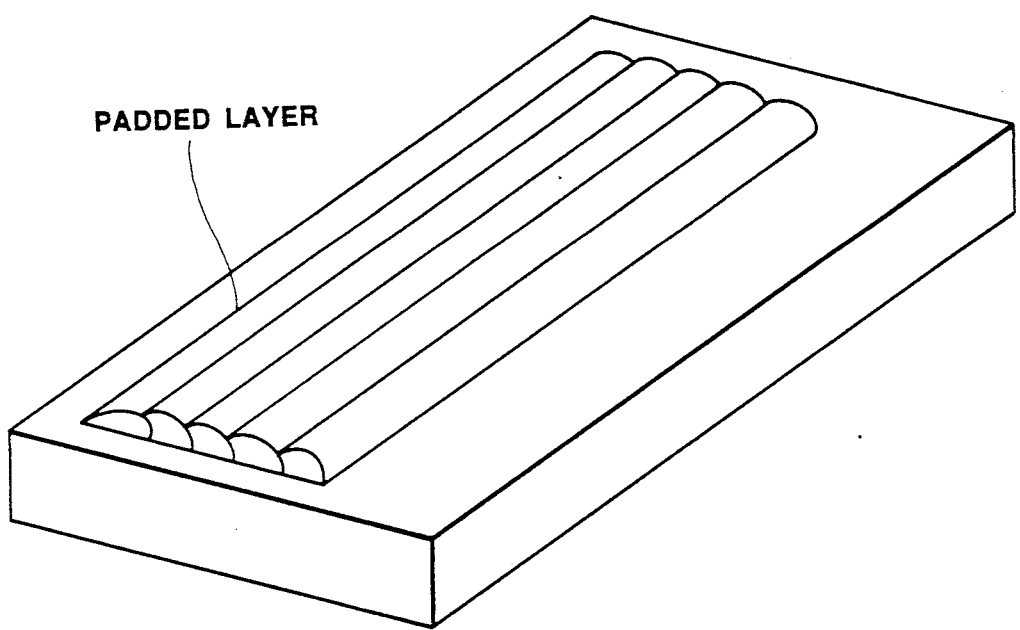
FIGS. 4 and 5 are diagrams for explaining padded layers and slag when the laser beam padding is carried out, respectively.
Figure 5:
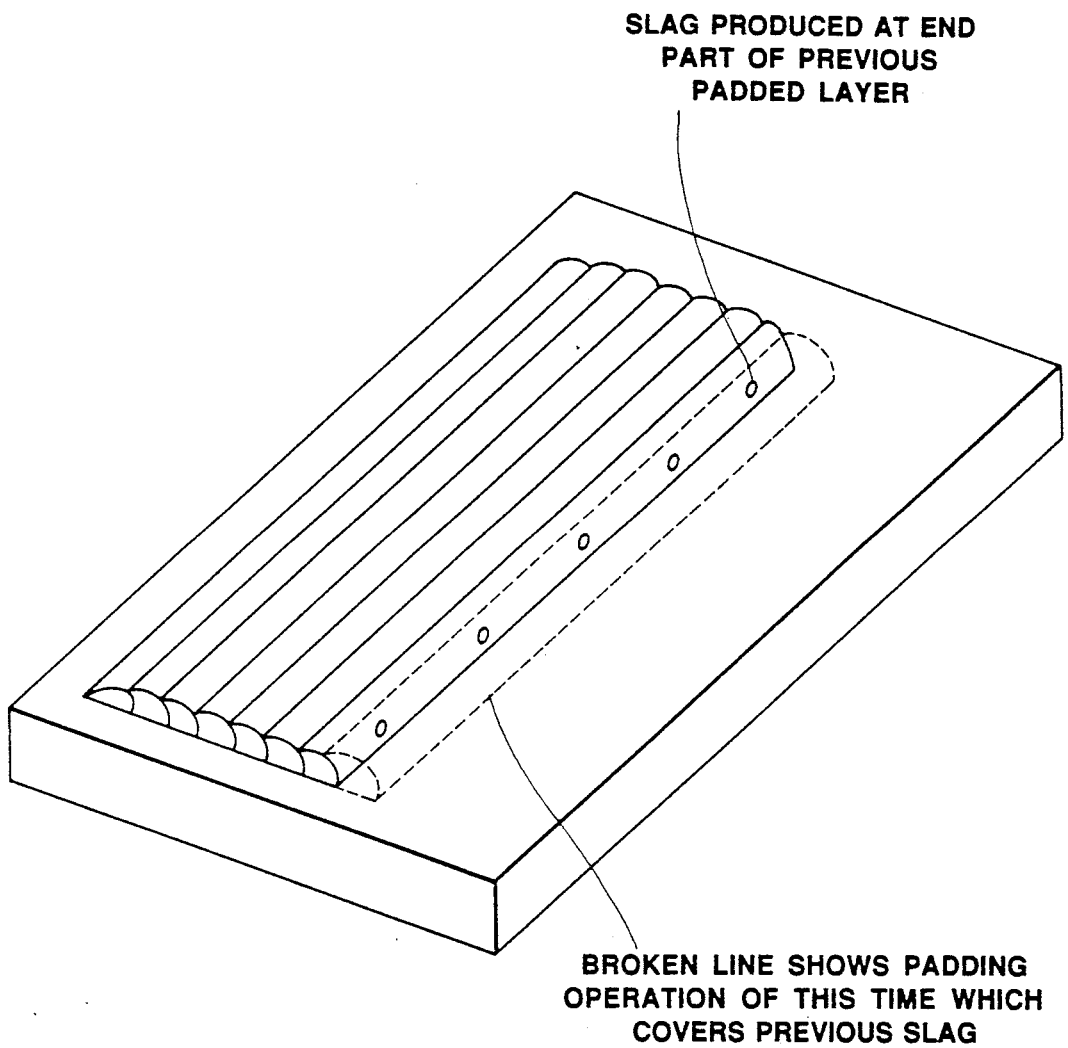

BEST MODE FOR CARRYING OUT THE INVENTION 96.49 weight % of copper powder, 2.5 weight % of nickel powder, 0.5 weight % of silicon powder, 0.2 weight % of boron (B) powder, 0.3 weight % of phosphorus (P) powder, and 0.01 weight % of molybdenum boride (Mo$_2$B$_5$) powder are mixed as shown in FIG. 1 to prepare mixture powder. The mixture powder is supplied as material powder 4 onto a groove V (to be padded) made in the surface of an iron plate 1 from a supply pipe of such a padding apparatus as shown in FIG. 3, while an argon gas as a gas 5 is supplied onto the groove V at a rate of 0.5 to 10 l/min, and at the same time, the iron plate 1 is driven along the groove V made therein at a speed of 1 m/min., as a result of which a padded layer 6 is formed within the padding groove V.

In this case, it is preferable that a diameter r of the supply pipe satisfies a relation of $2a < r < 3a$, and it is also preferable that a distance between the tip end of the pipe and the metal base material 1 is set to be below 5a, where a denotes the width of the padding groove.

When the diameter of the supply pipe is smaller than 2a the gas sealing becomes insufficient, whereas, when the pipe diameter is larger than 3a a disturbance takes place in the gas flow also with sufficient sealing effect. In addition, under such conditions, the gas consumption is increased. When the distance between the tip end of the supply pipe and the surface of the metal base material exceeds 5a, a disturbance occurs in the argon gas and the oxidation preventing effect is lost due to air involvement.

The padded layer thus formed was subjected to a sliding friction test, results of which are shown in FIG. 2. As shown in FIG. 2, the present invention layer and the partner material could both be reduced about 20% in friction amount when compared with the prior art, and thus the invention could exhibit a highly excellent sliding characteristic. This padded copper alloy layer is effective, in particular, when the partner material is iron, with high practical utility.

Although the respective elements have been mixed respectively as a single substance and then added to the material powder in the foregoing example, it goes without saying that the elements may be added respectively in the form of a compound, and that the material powder may be once melted to form an alloy and then the alloy may be changed again to a powder form.

For example, even when first alloy powder comprising 70.5 weight % of Cu, 20 weight % of Ni, 4.5 weight % of Si, 3 weight % of P and 2 weight % of B is mixed with second alloy powder comprising 90 weight % of Cu, 10 weight % of Sn and 0.02 weight % of P at a ratio of 85 to 15 and the mixture powder is used as the padding material, a padded layer having an excellent characteristic can be obtained.

Figure 6:
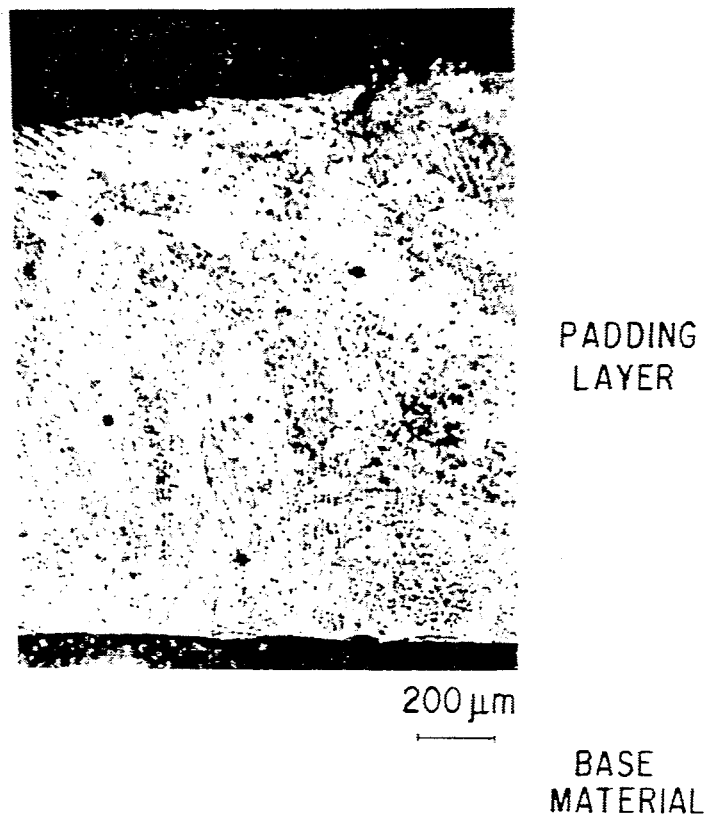
FIG. 6 is a photograph showing a cross-sectional microstructure of a padded layer formed in accordance with the present invention in a direction perpendicular to a padding direction.
Figure 7:
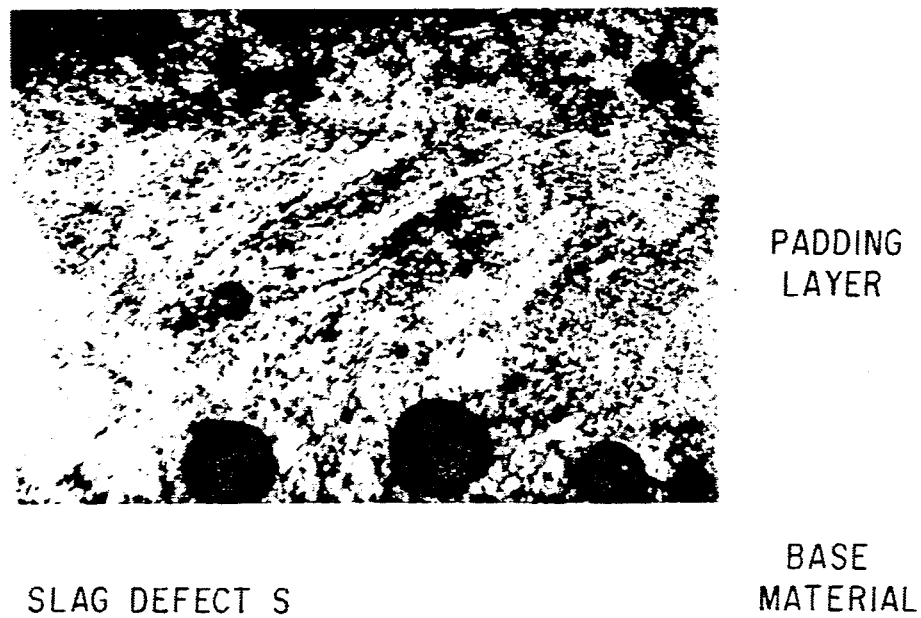
FIG. 7 and 8 are photographs showing cross-sectional microstructures of padded layers using prior art copper-tin-lead alloy and copper-tin alloy, respectively.
Figure 8:
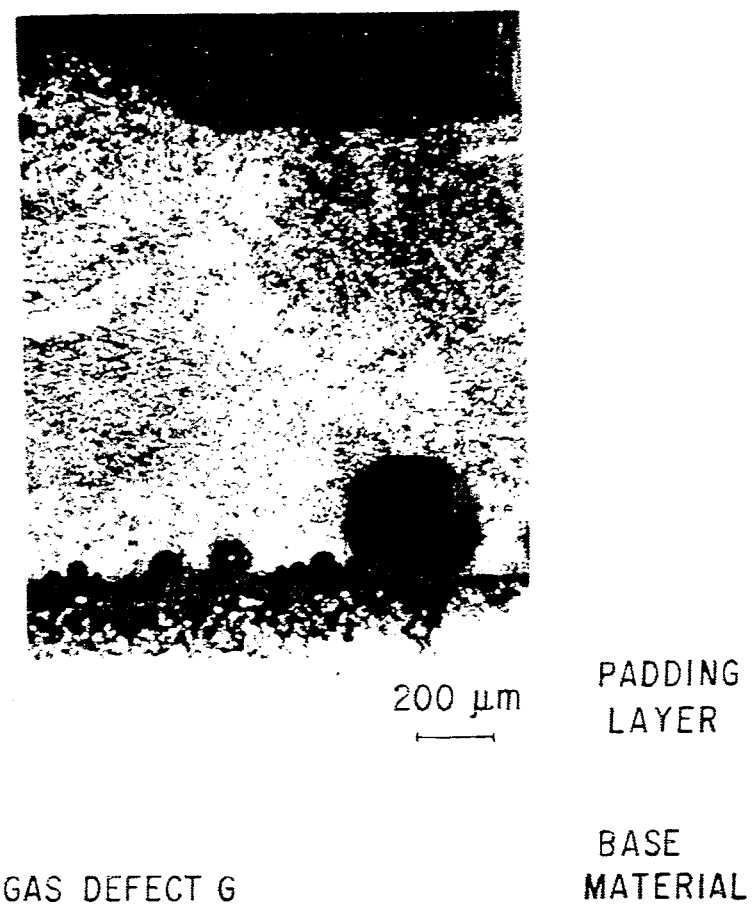

FIG. 6 shows a photograph showing a cross-sectional microstructure of the padded layer thus formed in a direction perpendicular to the padding direction. For comparison, photographs showing cross-sectional microstructures of padded layers using prior art copper-tin-lead alloy and copper-tin alloy are shown in FIGS. 7 and 8 respectively. As will be clear from comparison between the photographs, many slag defects S which are possibly iron oxides are observed in the boundary with the base material in such a padded layer based on the LBC (copper-tin-lead) alloy as shown in FIG. 7, while a lot of large (above 200 $\mu$m) gas defects G are observed in such a padded layer based on the copper-tin alloy as shown in FIG. 8. In the padded layer of the present invention, such slag defects S cannot be observed and such gas defects G are as small in diameter size as below about 50 $\mu$m and also small in number.

We can consider this as follows:

In the case of the use of copper-tin-lead alloy, many iron oxide slags are formed due to iron contained in the alloy in a very small quantity. Because the laser processing speed is very fast and the laser melt time after the irradiation of a laser beam is as very short as 0.1 to 0.5, the molten alloy is set or hardened before these slags produced through the laser beam irradiation float up to the surface of the molten alloy, thus involving or keeping the slags within the alloy. This is, we consider, because iron is lowest in oxide formation free energy among elements contained in the alloy and thus iron oxides are preferentially formed and the specific gravity of the iron oxides is about 5.2 that is relatively close to the specific gravity or copper of about 8.9.

In the case of the alloy of the present invention, in contrast with the copper-tin-lead alloy, since the invention alloy contains silicon and boron that are low in oxide formation free energy as shown nearly at 1600° C. in FIG. 9, these silicon oxides and boron oxides are preferentially formed. Because the specific gravities of these oxides are very small, that is, the silicon oxide has a specific gravity of about 2.6 and the boron oxide has a specific gravity of about 1.8 and these specific gravities are as very small as about several tenths of about 8.9 that is the specific gravity of copper; these slag oxides are evaporated and thus such slag involvement is not caused.

In this way, in accordance with the present invention, since slags having a very small specific gravity corresponding to about several tenths of the copper specific gravity are forcingly formed and float upward due to the specific gravity difference to be separated from the alloy, slag involvement can be prevented.

Further, the effect of such deoxidation agent as silicon or boron also enables the remarkable reduction of gas defect.

Moreover, in the case where carbons contained in the carbon steel or cast iron as the base material react with oxygens contained in copper alloy powder in a very small quantity, carbon monoxide gas is formed and becomes the cause of gas defects. In the case of the copper-tin alloy, there occur many gas defects in the boundary between the alloy and the base material.

In the case of the alloy of the present invention, on the other hand, when it is assumed that the alloy melted by a laser beam is at about 1500° C., the alloy contains silicons and borons whose oxide formation free energy are lower than carbon monoxide formation free energy as shown by an oxide formation free energy curve in the vicinity of 1600° C. in FIG. 10, so that silicon oxide and boron oxide are preferentially formed and the formation of carbon monoxide gas is suppressed, with the result that there can be obtained an alloy layer which is less in gas defect quantity.

Figure 12:
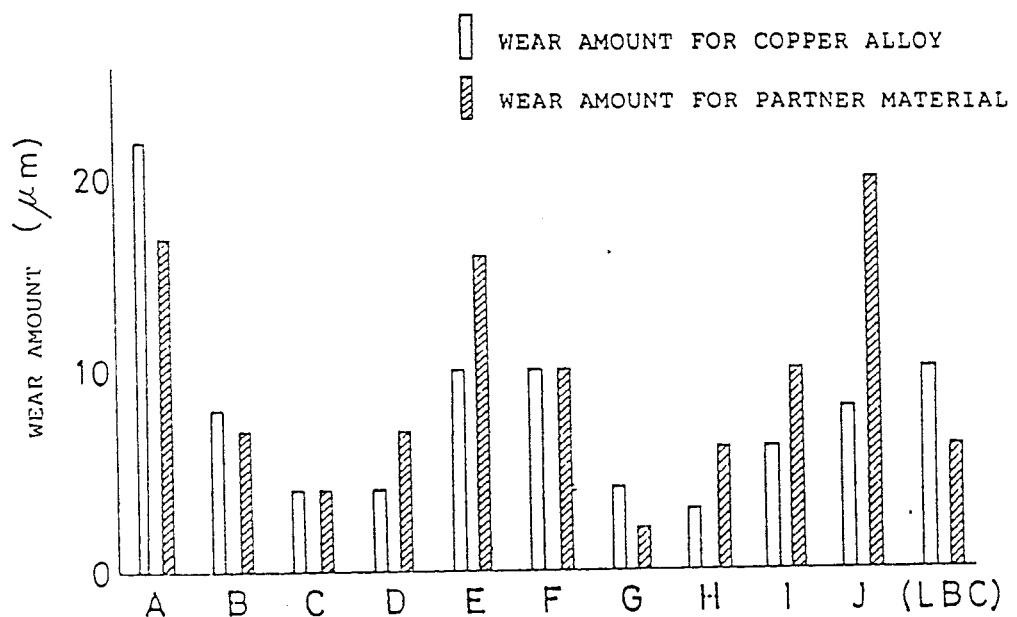
FIG. 12 is a graph showing sliding friction test results of the mixture of FIG. 11 and a prior art mixture, together with associated partner materials for comparison therebetween.

As shown in FIG. 11, different sorts of powder mixtures are prepared which comprise different amounts of copper powders, nickel powders, silicon powders, boron (B) powders, phosphorus (P) powders, tin powders. In a similar manner to the foregoing embodiment, each of these powder mixtures is supplied as the material powder 4 from the supply pipe of the padding apparatus of FIG. 3 to the padding groove V formed in the iron plate 1 while an argon gas as the gas 5 is supplied onto the padding groove V at a rate of 0.5-10 l/min., the iron plate 1 is driven at a speed of 1 m/min. along the padding groove V to thereby form a padded layer 6. FIG. 12 is a table showing results when the padded layers 6 thus formed are subjected to a sliding friction test with a low peripheral speed, a high surface pressure, at a sliding surface area ratio (between copper alloy and partner material) of 1 to 1. In the drawing, reference symbol LBC corresponds to a result of the prior art material LBC when subjected to the similar test.

The following will be seen from the above results.

First, since a Cu alloy containing less than 1 weight % of Ni is insufficient in strength, the Cu alloy is subjected to an extreme high wear and the worn powder of the Cu alloy further enter into the sliding area to cause the partner material to also increase in wear, which results in that the Cu alloy is unsuitable as a sliding material (from the results of a test A).

Since a Cu alloy containing more than 5 weight % of Ni increases in hardness, the wear of the partner material increases extremely and the worn powder of the Cu alloy enters into the sliding area, thus also involving the increase to wear of the copper alloy (from the results of a test E).

Further, a molar ratio of Ni to Si is 2 to 1 as a general basic measure but the ratio must be determined taking a gas defect generation rate into consideration. When the weight percentage of Si in the Cu alloy exceeds 5, the padding part is subjected to a cracking because the cooling rate of the laser padding is fast.

When the weight percentage of P in the Cu alloy exceeds 2, the Cu alloy is subjected to a separation of a large amount of $Cu_3P$ or the like and the Cu alloy becomes hard and brittle.

In addition, only 0.09 weight % of B can be solubilized in the Cu in the form of solid phase and an excessive additional B other than 0.09 weight % of B used as a deoxidation agent produces such compound as $CuB_{22}$, in which case the hardness is also increased. For this reason, the weight percentage of B in the Cu is desirably to be below 1.

When the weight percentage of Mn in the Cu alloy exceeds 3, this causes the wear of the partner material to be also increased, which results in that such a Cu alloy is improper as a sliding material.

E to J show examples when 8-15 weight % of Sn are added in Cu alloys. It will be appreciated from the test E to J that when 8-15 % of Sn is added and less than 1 weight % of Ni is added in the Cu alloy, such a Cu alloy becomes insufficient in strength and thus extremely high in wear, the worn powder of the Cu alloy enters into the sliding area and thus the wear or the partner material is increased, resulting in that the Cu alloy is unsuitable as a sliding material (from the test F).

When the weight percentage of Ni in a Cu alloy exceeds 5, a large amount of hard compounds including $Ni_3Sn$ is produced in the alloy and strongly promotes the wear of the partner material. As a result, even when 8-15% of Sn is added, it is desirable to add 1-5 weight % of Ni.

Substantially the same explanation as in the foregoing case where Sn is not added is true for the other components of the Cu alloy.

When less than 2 weight % of Ti is added regardless of addition or no addition of Sn, black oxide $Ti_2O_3$ produces in the Cu alloy and exhibits a deoxidation action, that is, a gas defect preventing action. Further, the black oxide, which is smaller specific gravity than copper, floats on the surface of the molten pool. When a laser beam is radiated onto the surface of the molten pool, the presence of the black oxide on the pool surface causes the laser beam absorption factor of the Cu alloy to be improved, thus enabling the realization of improvement of its padding property and efficiency.

Figure 13:
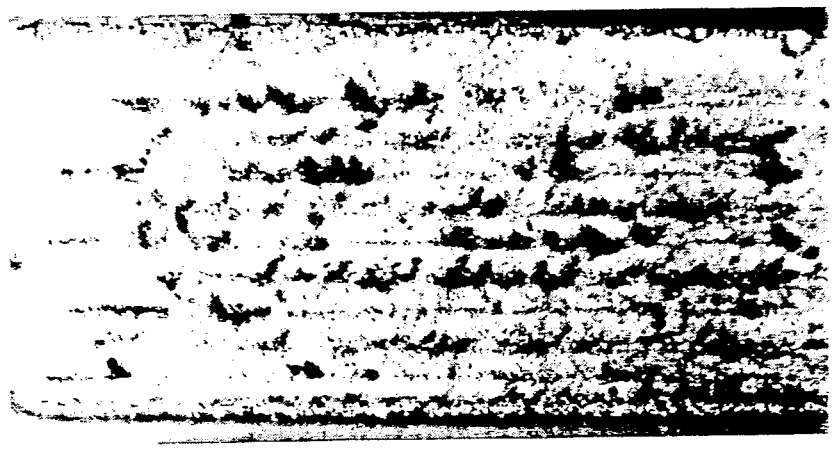
FIGS. 13 and 14 are photographs of layers padded in accordance with the method, as viewed from their tops.
Figure 14:
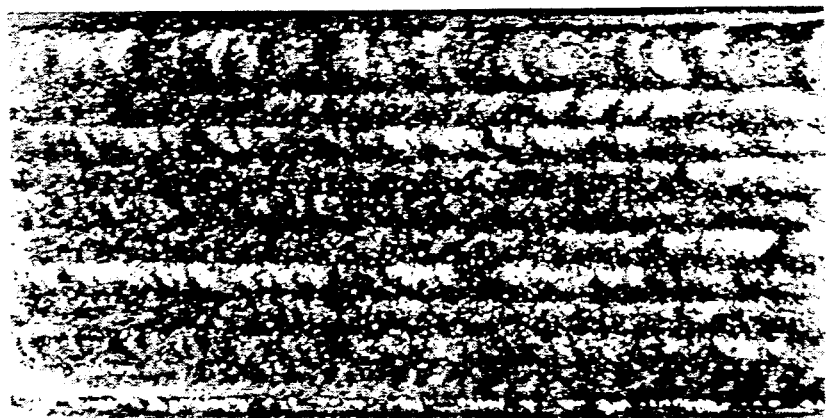

The padded layers thus obtained are depicted in FIGS. 13 and 14 as photographs viewed from their top. More specifically, FIG. 13 shows a copper alloy (Cu-Ni-Si-P-B-Sn) having a component ratio of H (refer to FIG. 11), while FIG. 14 shows a copper alloy (Cu-Ni-Si-P-B-Sn-Ti) having a component ratio of H (refer to FIG. 11) and further added with 0.5 weight % of Ti. In the case of the copper alloy of FIG. 14, the black oxide $Ti_2O_3$ generated by the addition of Ti floats on the surface of the molten pool and improves the absorption factor of the laser beam, the padding property and efficiency.

INDUSTRIAL APPLICABILITY

In this way, when the laser padding material and a laser padding method using the same in accordance with the present invention is used, such laser padding that has been conventionally considered practically impossible to be carried out with respect to copper materials, can become possible. As a result, there can be obtained easily and at a high speed a padded layer which is excellent in anti-friction characteristic and high in dimensional accuracy, and which is highly effectively applied to such a sliding part as a hydraulic part.

We claim:

1. A laser padding material comprising copper (Cu) as a main component and, as other contained elements, 1-5 weight % of nickel (Ni), 0.2-5 weight % of silicon (Si) and at least one deoxidizing element selected from the group consisting of: less than 1 weight % of boron (B), less than 2 weight % of phosphorus (P) and less than 3 weight % of manganese (Mn).

2. A laser padding material as set forth in claim 1, wherein said contained elements are provided respectively in the form of powder of a substance consisting of one or more of the elements.

3. A laser padding material as set forth in claim 1, wherein said contained elements are provided in the form of copper alloy powder.

4. A laser padding material as set forth in claim 1, further comprising ceramic powder.

5. A laser padding material as set forth in claim 4, wherein said ceramic powder is alumina ceramic powder.

6. A laser padding material as set forth in claim 1, wherein said nickel and silicon are provided to be 2 to 1 in molar ratio.

7. A laser padding material comprising copper (Cu) as a main component and, as other contained elements, 1-5 weight % of nickel (Ni), 0.2-5 weight % of silicon (Si) and at least one deoxidizing element selected from the group consisting of: less than 1 weight % of aluminum (Al) and less than 1 weight % of calcium (Ca).

8. A laser padding material as set forth in claim 7, wherein said contained elements are provided respectively in the form of powder of a substance consisting of one or more of the elements.

9. A laser padding material as set forth in claim 7, wherein said contained elements are provided in the form of copper alloy powder.

10. A laser padding material as set forth in claim 7, further comprising ceramic powder.

11. A laser padding material as set forth in claim 10, wherein said ceramic powder is alumina ceramic powder.

12. A laser padding material as set forth in claim 7, wherein said nickel and silicon are provided to be 2 to 1 in molar ratio.

13. A laser padding material comprising copper (Cu) as a main component and, as other contained elements, 1-5 weight % of nickel (Ni), 0.2-5 weight % of silicon (Si) and at least one deoxidizing element selected from the group consisting of: less than 1 weight % of boron (B), less than 2 weight % of phosphorus (P), less than 3 weight % of manganese (Mn), 8-15 weight % of tin (Sn), 8-15 weight % of lead (Pb), and less than 2 weight % of titanium (Ti).

14. A laser padding material comprising the steps of:
supplying, onto a metal base material, material powder which includes copper as a main component and, as other contained elements, 1-5 weight % of nickel (Ni), 0.2-5 weight % of silicon (Si), and at least one deoxidizing element selected from the group consisting of: less than 1 weight % of boron (B), less than 2 weight % of phosphorus (P), and less than 3 weight % of manganese (Mn); and
irradiating a laser beam on said material powder in an inert gas atmosphere, and wherein the material powder is melted on said metal base material to form a laser padded layer thereon.

15. A laser padding method as set forth in claim 14, wherein said supplying step is carried out by supplying said contained elements in the form of powder of a substance consisting of one or more of the elements.

16. A laser padding method as set forth in claim 14, wherein said supplying step is carried out by supplying copper alloy powder including said contained elements.

* * * * *